(12) United States Patent
Zielinski et al.

(10) Patent No.: US 6,889,166 B2
(45) Date of Patent: May 3, 2005

(54) INTRINSICALLY SAFE FIELD MAINTENANCE TOOL

(75) Inventors: Martin Zielinski, Chanhassen, MN (US); Daniel E. Vande Vusse, Savage, MN (US); Kun Yang, Eden Prairie, MN (US); Alan R. Dewey, Plymouth, MN (US); Alden C. Russell, III, Minnetonka, MN (US)

(73) Assignee: Fisher-Rosemount Systems, Inc., Austin, TX (US)

(*) Notice: Subject to any disclaimer, the term of this patent is extended or adjusted under 35 U.S.C. 154(b) by 54 days.

(21) Appl. No.: 10/310,703

(22) Filed: Dec. 5, 2002

(65) Prior Publication Data

US 2003/0109937 A1 Jun. 12, 2003

Related U.S. Application Data

(60) Provisional application No. 60/338,477, filed on Dec. 6, 2001.

(51) Int. Cl.$^7$ .............................................. G06F 11/30
(52) U.S. Cl. .................. 702/183; 702/59; 702/104; 702/116; 702/183; 370/465; 370/466; 709/230; 709/228; 700/51; 700/129
(58) Field of Search .................. 702/57, 59, 104, 702/116, 182–185, 188; 370/465, 466; 709/230, 228; 700/51, 129

(56) References Cited

U.S. PATENT DOCUMENTS

| | | | |
|---|---|---|---|
| 4,337,516 A | 6/1982 | Murphy et al. | 364/551 |
| 4,630,265 A | 12/1986 | Sexton | 370/86 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,103,409 A | 4/1992 | Shimizu et al. | 364/556 |
| 5,113,303 A | 5/1992 | Herres | 361/45 |
| 5,150,289 A | 9/1992 | Badavas | 64/154 |
| 5,197,328 A | 3/1993 | Fitzgerald | 73/168 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,570,300 A | 10/1996 | Henry et al. | 364/551.01 |
| 5,573,032 A | 11/1996 | Lenz et al. | 137/486 |
| 5,598,521 A | 1/1997 | Kilgore et al. | 395/326 |

(Continued)

FOREIGN PATENT DOCUMENTS

| | | | |
|---|---|---|---|
| DE | 29917651 | 12/2000 | |
| DE | 1993 0660 A1 | 1/2001 | |
| EP | 1 022 626 A2 | 10/1997 | 19/42 |

(Continued)

OTHER PUBLICATIONS

Stwart, 'Rethink Instrument Specifications when Specifying Fieldbus Devices', Sep. 1999, control engineering, pp. 1–1.*
Samson, 'Technical Information' Jun. 1999, Samson AG,L452 & L454, Dec. 1999, pp. L452 (1–40) & L454 (1–42).*

(Continued)

*Primary Examiner*—Hal Wachsman
*Assistant Examiner*—Elias Desta
(74) *Attorney, Agent, or Firm*—Westman, Champlin & Kelly, P.A.

(57) ABSTRACT

An improved intrinsically safe field maintenance tool is provided. The tool is operable with process communication loops in accordance with a plurality of process industry standard protocols. Aspects of the invention include hardware features such as an infrared port; removable memory module; and an expansion memory module. Additional aspects of the invention include protocol-specific diagnostic methods executable with the improved intrinsically safe field maintenance tool.

10 Claims, 6 Drawing Sheets

U.S. PATENT DOCUMENTS

| | | | |
|---|---|---|---|
| 5,623,605 A | 4/1997 | Keshav et al. | 395/200.17 |
| 5,665,899 A | 9/1997 | Willcox | 73/1.63 |
| 5,742,845 A | 4/1998 | Wagner | 395/831 |
| 5,764,891 A | 6/1998 | Warrior | 395/200.2 |
| 5,828,567 A | 10/1998 | Eryurek et al. | 364/184 |
| 5,838,187 A | 11/1998 | Embree | 327/512 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A | 9/1999 | Sharpe, Jr. et al. | 395/835 |
| 5,970,430 A | 10/1999 | Burns et al. | 702/122 |
| 5,980,078 A | 11/1999 | Krivoshein et al. | 364/131 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,094,600 A | 7/2000 | Sharpe, Jr. et al. | 700/19 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,199,018 B1 | 3/2001 | Quist et al. | 702/34 |
| 6,236,334 B1 | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,298,377 B1 | 10/2001 | Hartkainen et al. | 709/223 |
| 6,307,483 B1 | 10/2001 | Westfield et al. | 340/870.11 |
| 6,324,607 B1 | 11/2001 | Korowitz et al. | 710/102 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,434,504 B1 | 8/2002 | Eryurek et al. | 702/130 |
| 6,444,350 B1 | 9/2002 | Toya et al. | 429/90 |
| 6,449,574 B1 | 9/2002 | Eryurek et al. | 702/99 |
| 6,473,710 B1 | 10/2002 | Eryurek | 702/133 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,594,603 B1 | 7/2003 | Eryurek et al. | 702/104 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B2 | 9/2003 | Borgeson et al. | 702/183 |
| 6,654,697 B1 | 11/2003 | Eryurek et al. | 702/47 |
| 6,656,145 B1 | 12/2003 | Morton | 602/27 |
| 2001/0053065 A1 | 12/2001 | Cudini et al. | 361/728 |
| 2002/0065631 A1 * | 5/2002 | Loechner | 702/188 |
| 2002/0077711 A1 * | 6/2002 | Nixon et al. | 700/51 |
| 2002/0123864 A1 * | 9/2002 | Eryurek et al. | 702/188 |
| 2003/0023795 A1 * | 1/2003 | Packwood et al. | 710/105 |
| 2003/0033040 A1 | 2/2003 | Billings | 700/97 |

FOREIGN PATENT DOCUMENTS

| | | |
|---|---|---|
| EP | 1022626 A2 | 7/2000 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/14855 | 4/1998 |
| WO | WO/98/39718 | 9/1998 |
| WO | WO 00/41050 | 7/2000 |
| WO | WO 00/557000 | 9/2000 |
| WO | WO 02/027418 | 4/2002 |

OTHER PUBLICATIONS

Diedrich et al., 'Field Device Integration in DCS Engineering using a Device Model', Aug. 31, 1998, pp. 164–168.*

U.S. patent application Ser. No. 09/384,876, Eryurek et al., filed Aug. 27, 1999.

U.S. patent application Ser. No. 09/409,098, Eryurek et el., filed Sep. 30, 1999.

U.S. patent application Ser. No. 09/799,824, Rome et el., filed Mar. 5, 2001.

U.S. patent application Ser. No. 09/852,102, Eryurek et el., filed May 9, 2001.

U.S. patent application Ser. No. 09/855,179, Eryurek et el., filed May 14, 2001.

"Fluke 179 Multimeter & ToolPak Combo Pack, "http://www.fluke.com/Multimeter/Toolpak.ASP?AGID=6&SID=260 (2 pages).

"Multifunction PDA Calibrator Transmation Model 3–PMF1, " Transmation, Apr. 2001.

"AAPA 60 & 90 Series Multimeter," http://www.appatech.com/a–60new.htm (5 pages).

"Fieldbus Standard for Use in Industrial Control Systems Part 2: Physical Layer Specification and Service Definition", ISA–S50. 02–1992, pp. 1–93.

Hart Communications, Technical Information, Part 4 Communications, Samson, Frankfurt.

* cited by examiner

INTRINSICALLY SAFE FIELD MAINTENANCE TOOL

The present application claims the benefit of U.S. provisional patent application Ser. No. 60/338,477, filed Dec. 6, 2001, entitled "INTRINSICALLY SAFE FIELD MAINTENANCE TOOL," which application is incorporated herein by reference.

BACKGROUND OF THE INVENTION

Intrinsically safe field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe hand held field maintenance tool allows technicians to quickly diagnose such errors in the field.

One such device is sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance. However, the Model 275 does not currently support communication with non-HART® (Highway Addressable Remote Transducer) devices.

The HART® protocol has a hybrid physical layer consisting of digital communication signals superimposed on the standard 4–20 mA analog signal. The data transmission rate is approximately 1.2 Kbits/SEC. HART® communication is one of the primary communication protocols in process industries.

Another major process industry communication protocol is known as the FOUNDATION™ fieldbus communication protocol. This protocol is based on an ISA standard (ISA-S50.01-1992, promulgated by the Instrument Society of America in 1992). A practical implementation was specified by the Fieldbus Foundation (FF). FOUNDATION™ Fieldbus is an all-digital communication protocol with a transmission rate of approximately 31.25 Kbits/SEC.

Known intrinsically safe field maintenance tools are not able to effectively interact using more than one process industry standard protocol. Providing a device that has the ability to operate with more than one process industry standard protocol as well as effectively providing protocol-specific calibration and configuration options would represent a significant advance in the art.

SUMMARY OF THE INVENTION

An improved intrinsically safe field maintenance tool is provided. The tool is operable with process communication loops in accordance with a plurality of process industry standard protocols. Aspects of the invention include hardware features such as an infrared port; removable memory module; and an expansion memory module. Additional aspects of the invention include protocol-specific diagnostic methods executable with the improved intrinsically safe field maintenance tool.

DETAILED DESCRIPTION OF THE PREFERRED EMBODIMENTS

An improved intrinsically safe field maintenance tool in accordance with embodiments of the present invention is operable with at least two industry standard device descriptions. In one specific embodiment, an improved intrinsically safe field maintenance tool implements both HART® and fieldbus Device Description Language (DDL). The improved field maintenance tool is used to maintain both two-wire and four-wire (i.e. external power) field devices using these protocols. Preferably, both configuration and calibration are supported via DDL technology. DDL technology is known and additional reading regarding Device Description Language can be found in U.S. Pat. No. 5,960,214 to Sharp, Jr. et al.

The improved intrinsically safe field maintenance tool also facilitates a convenient display of diagnostic information from individual field devices (i.e. status bits) as well as providing advanced protocol-specific network troubleshooting features. Further details and benefits of the improved intrinsically safe field maintenance tool in accordance with embodiments of the present invention will be appreciated after reading the description below.

Figure 1:
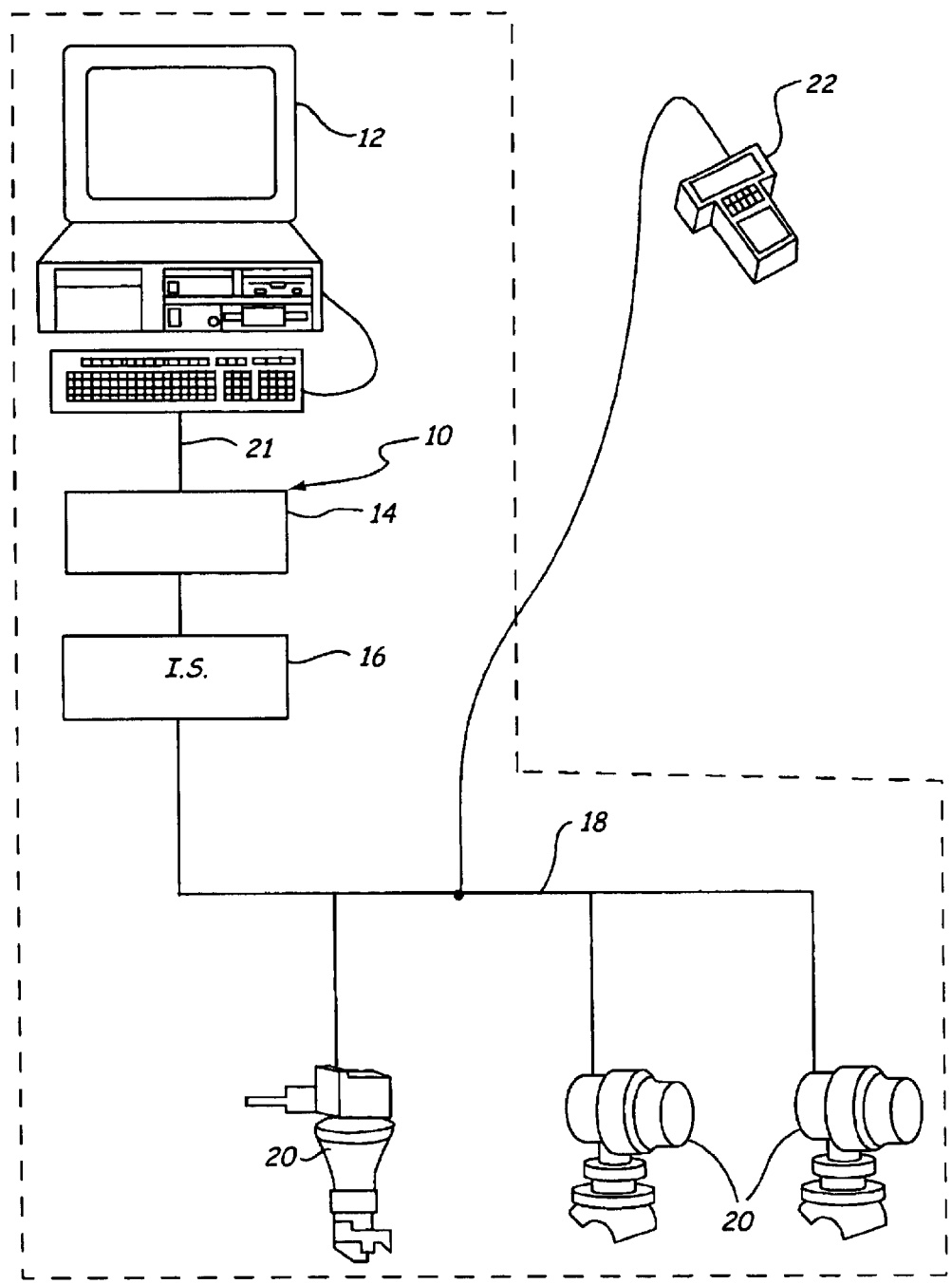
FIG. 1 illustrates a multidrop wiring configuration.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Intrinsically safe field maintenance tool 22 is coupled to loop 18 as illustrated in FIG. 1. When coupled to a process control loop as shown, tool 22 can perform a number of the communication and diagnostic functions. Tool 22 can couple to and interact with HART® process communication loops in much the same way the presently available Model 275 HART® Communicator can.

Figure 2A:
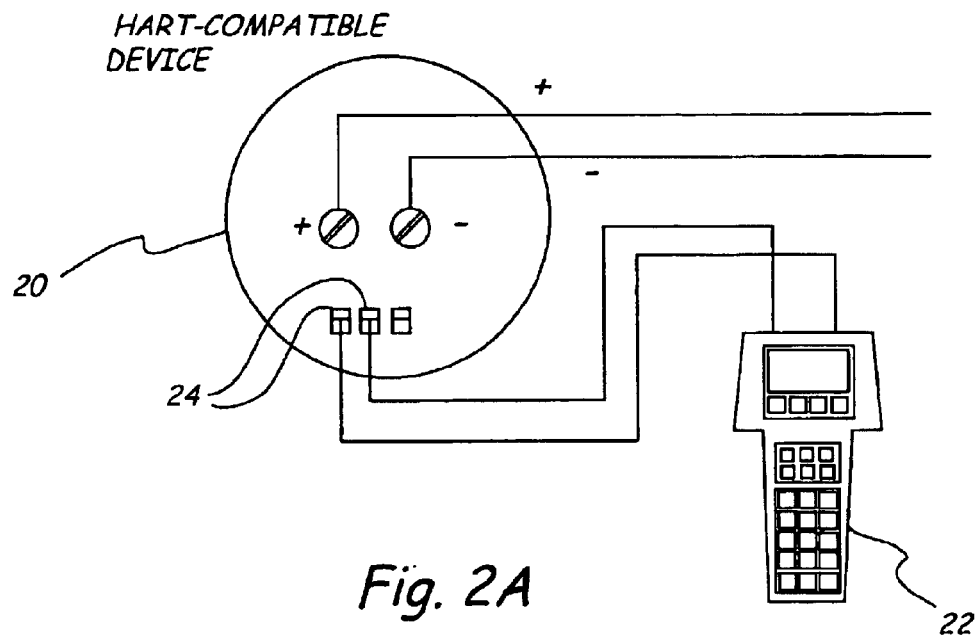
FIGS. 2A and 2B illustrate ways in which an intrinsically safe field maintenance tool may be connected to a process device.
Figure 2B:
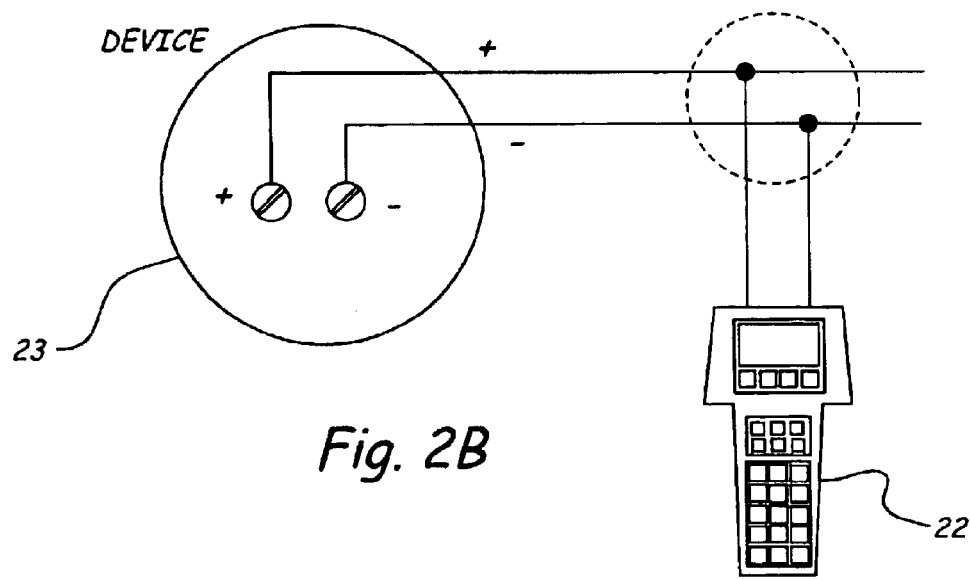

FIG. 2A illustrates tool 22 coupled to HART®-compatible device 20 via terminals 24. Alternately, tool 22 can communicate with a HART® compatible device on the process instrumentation communication loop, such as device 23 via the loop itself, as indicated in FIG. 2B.

Figure 3:
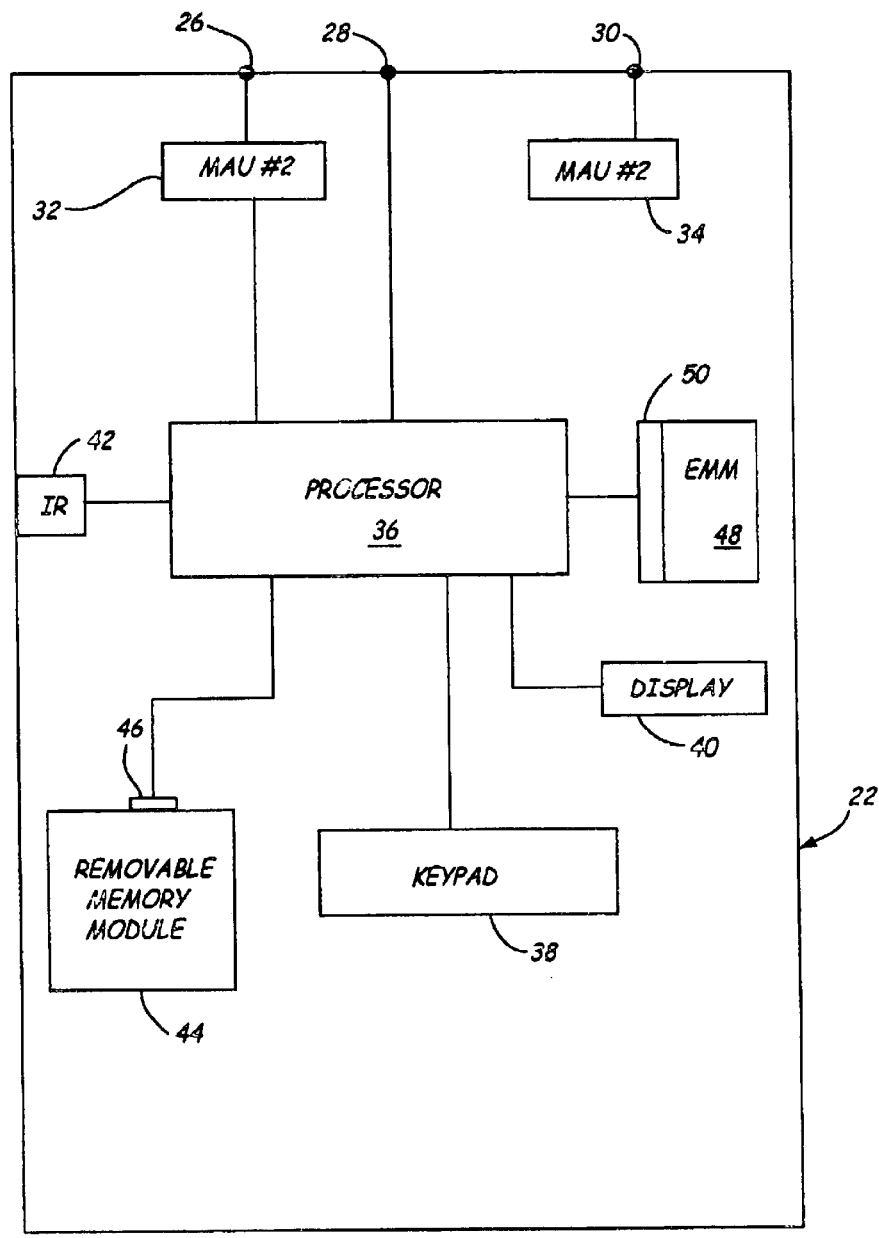
FIG. 3 is a diagrammatic view of field maintenance tool in accordance with an embodiment of the present invention.

FIG. 3 is a diagrammatic view of field maintenance tool 22 in accordance with embodiments of the present invention. As illustrated, tool 22 preferably includes three communication terminals 26, 28 and 30 which facilitate coupling tool 22 to process communication loops and/or devices in accordance with at least two process industry standard protocols. For example, when tool 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when tool 22 is to be coupled to a process and control measurement loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of tool 22 in order to receive various keypad inputs from a user. Display module 40 is coupled to the display to provide data and/or a user interface.

In accordance with various embodiments of the present invention, tool 22 includes additional hardware enhancements that facilitate increased functionality over that generally available in the prior art. In one embodiment, tool 22 includes infrared data access port 42 which is coupled to processor 36 to allow tool 22 to transfer information to and from a separate device using infrared wireless communication. One advantageous use of port 42 is for transferring and/or updating Device Descriptions stored in one or more memories of tool 22. A Device Description (DD) is a software technology used to describe parameters in a field device in a computer-readable format. This contains all of the information necessary for a software application being executed on processor 36 to retrieve and use the parametric data. The separate device such as computer 12, can obtain a new Device Description from floppy disk, CD ROM, or the internet and wirelessly transfer the new Device Description to tool 22.

Removable memory module 44 is removably coupled to processor 36 via port/interface 46. Removable memory module 44 is adapted to store software applications that can be executed instead of primary applications on processor 36. For example, module 44 may contain applications that use the HART® or FOUNDATION™ fieldbus communication port, to provide a comprehensive diagnostic for a given process valve. Additionally, module 44 may store software applications that aid in the calibration or configuration of specific devices. Module 44 may also store a software image for a new or updated primary device application that can subsequently be transferred into the non-volatile memory of device 36 to enable execution of the updated application. Further still, module 44 provides removable memory storage for the configuration of multiple devices allowing a field maintenance operator to acquire a relatively substantial amount of device data and conveniently store or transfer such data by simply removing module 44.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition. Additionally, module 44 may include current limiting circuitry to ensure that in the event that specific terminals on module 44 are shorted, that the discharge energy is sufficiently low that ignition is inhibited. Finally, interface 44 may include physical characteristics that are specifically designed to prevent exposure of electrical contacts on memory module 44 to an external environment while simultaneously allowing suitable interface contacts to make electrical contact with module 44. For example, module 44 may include an over-modeling that can be pierced or otherwise displaced by coupling module 44 to interface 46.

Tool 22 also preferably includes expansion memory module 48 coupled to processor 36 via connector 50 which is preferably disposed on the main board of tool 22. Expansion memory module 48 may contain Device Descriptions of first and second industry standard protocols. Module 48 may also contain license code(s) that will determine the functionality of tool 22 with respect to the multiple protocols. For example, data residing within module 48 may indicate that tool 22 is only authorized to operate within a single process industry standard mode, such as the HART® protocol. Ultimately, a different setting of that data within module 48 may indicate that tool 22 is authorized to operate in accordance with two or more industry standard protocols. Module 48 is preferably inserted to a connector 50 on the main board and may in fact require partial disassembly of tool 22, such as removing the battery pack to access port 50.

The improved intrinsically safe field maintenance tool described above facilitates enhanced fieldbus-specific and HART®-specific diagnostics as will be set forth in greater detail below.

Figure 4:
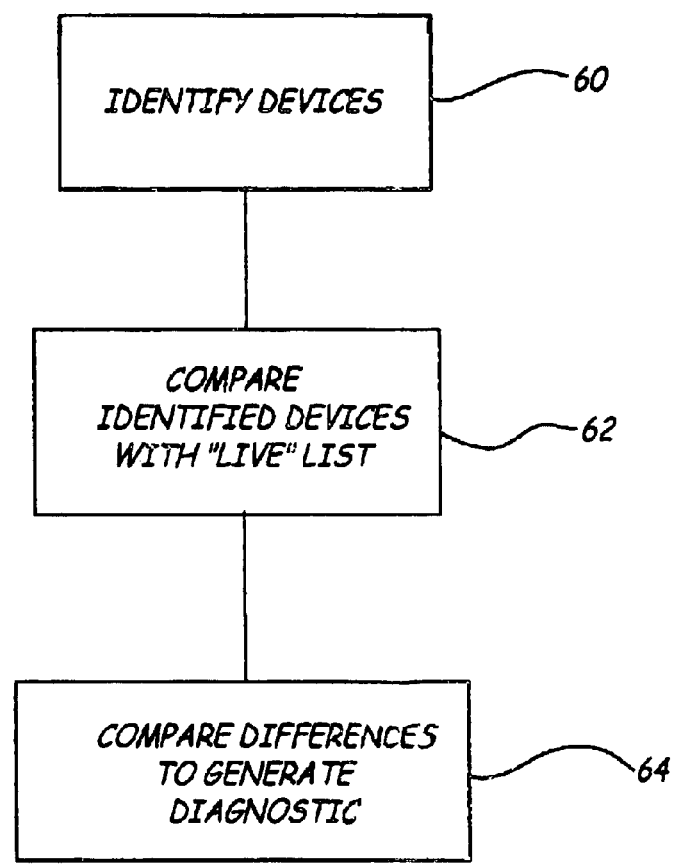
FIG. 4 is a flow diagram of a first FOUNDATION™ fieldbus specific diagnostic method in accordance with the present invention.

FIG. 4 is a flow diagram of a first FOUNDATION™ fieldbus specific diagnostic method executable using an improved intrinsically safe field maintenance tool in accordance with embodiments of the present invention. Specifically, when tool 22 is first coupled to an H1 segment (twisted pair wire transmission line) tool 22 will identify all devices connected to that segment, as indicated in block 60. This identification is done independent of the "live list." The "live list" as used herein means a list of nodes that a master device has identified on the network, which list is circulated among network masters. Preferably, a software option within tool 22 permits a user to skip the poll of all addresses executed in block 60 and simply command tool 22 to employ the existing live list. Once all connected devices have been identified the list of connected identified devices can be compared to the "live list" to identify differences between the actual devices found on the H1 segment and the live list, as indicated at block 62. The comparison can be used to generate a diagnostic output, as indicated at block 64. Preferably, a field maintenance operator can execute this diagnostic on demand via the keypad (not shown).

Figure 5:
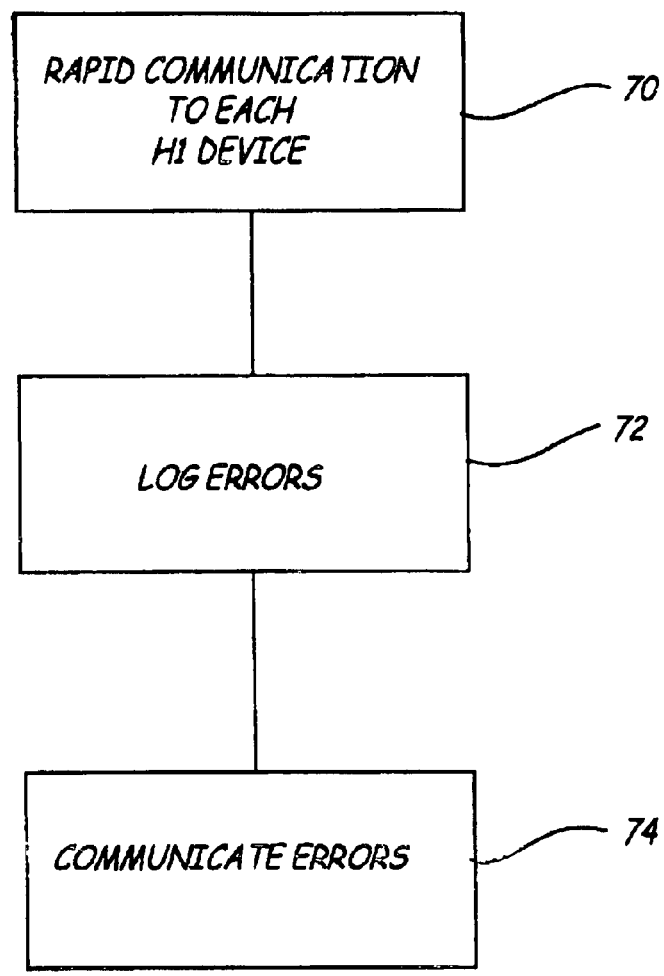
FIG. 5 is a flow diagram of a second FOUNDATION™ fieldbus specific diagnostic method in accordance with the present invention.

FIG. 5 is a flow diagram of a second FOUNDATION™ fieldbus specific diagnostic method executable with embodiments of the present invention. When the method of FIG. 5 begins, tool 22 communicates very rapidly to each identified device on the H1 segment, as indicated at block 70. Following the rules of the communication protocol, tool 22 transmits as many messages as possible to each device. At block 72, tool 22 logs all communications errors experienced for each node on the H1 segment. At block 74, tool 22 communicates a log of errors experienced on the H1 segment as indicated at block 74. Such communication may take the form of sending appropriate information to a control room or simply displaying such log information on the user interface of tool 22. Devices on the H1 segment that experience a higher than average number of communication errors are likely to have an intermittent associated fault. Typical faults include a loose connection, defective terminators, electronic fault and/or related to the topology. Preferably, a software option exists that permits the field maintenance user to select individual nodes for tool 22 to interrogate for communication errors.

Tool 22 can also measure additional characteristics of the FOUNDATION™ fieldbus segment to which it is coupled. Specifically, tool 22 can be used to measure the noise level on the fieldbus segment. Preferably, tool 22 employs one or more frequency-specific filters to measure signal amplitude within a selected frequency band. For example, tool 22 preferably employs a low-pass filter to extract a low-frequency portion of noise present on the fieldbus segment. This parameter can provide valuable troubleshooting information to field maintenance operators. Specifically, it may indicate a problem caused by a faulty power supply. Additionally, tool 22 can employ a band-pass filter to extract noise information near the frequency of FOUNDATION™ Fieldbus signaling frequencies during the time between messages. This parameter can provide valuable troubleshooting information to field maintenance operators, since noise near the FOUNDATION™ fieldbus signaling frequency can make the real FOUNDATION™ fieldbus signal very vulnerable. Additionally, tool 22 can also be used to measure the capacitance in a FOUNDATION™ fieldbus segment. The capacitance information can be used to detect shielding or grounding problems.

The improved intrinsically safe field maintenance tool can also be used to execute a number of HART® specific diagnostics. For example, tool 22 is preferably adapted to communicate using two distinct voltage levels for HART® communications. The first HART® communications voltage level (normal) is selected to meet the HART® specifications set forth above. However, the second voltage level is for communication by tool 22 in an enhanced communication mode when tool 22 will generate a stronger signal than meets the HART® specification and will listen and respond to signals weaker than those normally allowed by the HART® specification. Preferably, HART network diagnostic method includes sending a HART® command zero to each HART® network address in normal mode. The sent message count is incremented every time tool 22 attempts to communicate with a given HART® address. If a reply with no errors is received by tool 22, the diagnostics within tool 22 increment the count of good replies received by that address and the diagnostic method moves on to the next address. However, if there is either an error in the reply from the selected network address, or no reply at all, then tool 22 transitions into the enhanced communication mode. In the enhanced communication mode, the higher voltage level is used to generate HART® communication signals that are at amplitudes which exceed those normally allowed by the HART® specification. If a reply with no errors is received from the selected network address in the enhanced communication mode, then the weak reply count of that network address is incremented. Tool 22 moves to the next network address and will continue to try all network addresses until the field maintenance operator instructs tool 22 to halt, or an auto-power off event occurs. Preferably, software within tool 22 allows the field maintenance user to select specific HART network addresses to be polled. Further still, groups of network addresses are also preferably selectable. Thus, a field maintenance operator could, for example, selectably pull address 0, 1 and 4.

Figure 6:
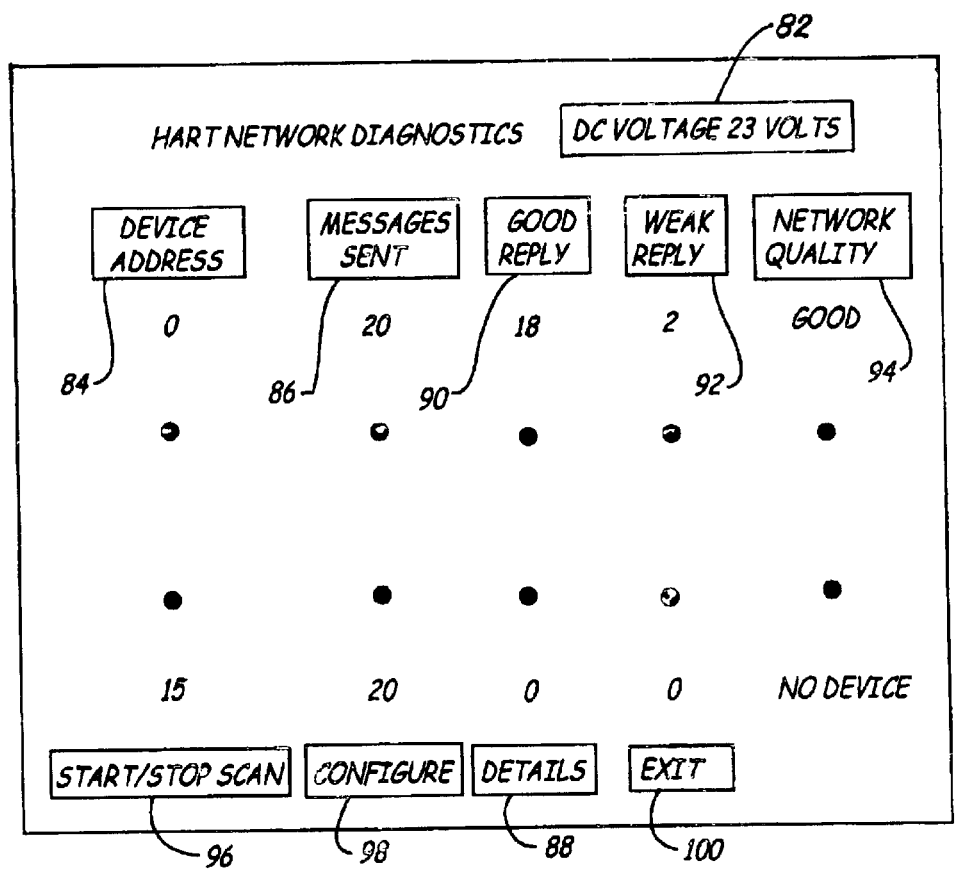
FIG. 6 is a diagrammatic view of a screen layout in accordance with an embodiment of the present invention.

FIG. 6 is a diagrammatic view of a screen layout illustrating information regarding the results of HART® specific network diagnostics on a display 80 in accordance with embodiments of the present invention. Display 80, in some embodiments, displays data relative to all 16 addresses on the HART® segment. However, it is expressly contemplated that in order to facilitate suitably readable displays, that one or more screens may be required to display all 16 addresses. Preferably, display 80 includes a portion 82 that provides information regarding the DC voltage on the loop. Portion 84 illustrates the HART® address of the tested device and preferably shows only those HART® devices configured to be scanned. "Messages Sent" portion 86 provides the total number of HART messages sent to the device at the specified address. Note, all counts preferably roll to *** if the number of characters exceeds the allowed space in the column. If this occurs, the total number of messages sent will be available in the "detail" screen if the field maintenance operator selects details portion 88 relative to the selected device address. "Good Reply" portion 90 and "Weak Reply" portion 92 illustrate the total number of replies heard when in normal signaling mode, and in the enhanced signaling mode, respectively. Network quality portion 94 provides a word qualification of the communication quality observed with the specified address. Preferred levels and suggested names are as follows:

A—good—HART® network is usable with standard HART® modems, such as multiplexers and commercially available control systems to provide continuous feedback data from the device. Network can be used for continuous data from the device;

B—usable—HART® network is usable with standard HART® modems, such as multiplexers and commercially available control systems to configure and check device status. Network can be used for configuration of the devices with standard HART® modems. Network is not reliable enough for continuous data flow from the devices for advanced diagnostics such as Valve Signatures;

C—Weak—HART® network is only usable with tool 22 in the enhanced communication mode. The network device will not work reliably with multiplexers or other commercially available HART® products; and D—No Device—HART® network not usable.

Additional portions of display 80 are shown at 96, 98 and 100. Portion 96, when selected by the field maintenance operator, will selectably start and stop the network scan. Portion 98 will select a specific HART® address to be scanned. Finally, selecting portion 100 allows the field maintenance operator to exit the screen.

Once a field maintenance operator has selected a specific HART® address on the screen, selecting "details portion" 88 will cause tool 22 to provide a full count for the messages, total sent, total good and total weak. A scrollable list of an arbitrary number of most recent bad replies including the time of occurrence, and error details such as parody and cyclic redundancy check (CRC) can be provided in the details portion.

In conclusion, an improved intrinsically safe field maintenance tool includes a number of hardware enhancements as well as enhanced industry-protocol specific network diagnostics. The improved intrinsically safe field maintenance tool is advantageously useable with a plurality of process communication and measurement loops having one or the other industry standard communication protocols. Thus, a field maintenance technician need not carry multiple distinct hand held devices into the field, but may advantageously use a single tool to interact with a plurality of process industry standard communication loops.

Although the present invention has been described with reference to preferred embodiments, workers skilled in the art will recognize that changes may be made in form and detail without departing from the spirit and scope of the invention.

What is claimed is:

1. An intrinsically safe field maintenance tool comprising:
   terminals selectably coupleable to a process communication loop having a process industry standard communication protocol;
   first and second media access units coupled to the terminals, wherein the first media access unit is adapted to communicate in accordance with a first process industry standard communication protocol, and wherein the second media access unit is adapted to communicate in accordance with a second process industry standard communication protocol;
   a processor coupled to the first and second media access units;
   a keypad coupled to the processor to receive user input;
   a display coupled to the processor to display data; and
   an infrared port coupled to the processor to wirelessly communicate with an external device.

2. An intrinsically safe field maintenance tool comprising:
   terminals selectably coupleable to a process communication loop having a process industry standard communication protocol;
   first and second media access units coupled to the terminals, wherein the first media access unit is adapted to communicate in accordance with a first process industry standard communication protocol, and wherein the second media access unit is adapted to communicate in accordance with a second process industry standard communication protocol;
   a processor coupled to the first and second media access units;
   a keypad coupled to the processor to receive user input;
   a display coupled to the processor to display data; and
   a removable memory module removably coupled to the processor.

3. The tool of claim 2, wherein the memory module is adapted to be removable in hazardous environments.

4. The tool of claim 3, wherein the removable memory module has energy limiting circuits selected to facilitate intrinsic safety compliance.

5. The tool of claim 2, wherein the removable memory module contains a software application executable on the processor.

6. The tool of claim 2, wherein the removable memory module provides storage for device configuration data.

7. An intrinsically safe field maintenance tool comprising:
   terminals selectably coupleable to a process communication loop having a process industry standard communication protocol;
   first and second media access units coupled to the terminals, wherein the first media access unit is adapted to communicate in accordance with a first process industry standard communication protocol, and wherein the second media access unit is adapted to communicate in accordance with a second process industry standard communication protocol;
   a processor coupled to the first and second media access units;
   a keypad coupled to the processor to receive user input;
   a display coupled to the processor to display data; and
   an expansion memory module coupled to the processor via a connector disposed on a mainboard.

8. The tool of claim 7, wherein the expansion module contains data relative to protocol authorization.

9. The tool of claim 7, wherein the expansion module contains data that authorizes additional software applications.

10. The tool of claim 7, wherein the expansion module contains data relative to a plurality of device descriptions, wherein a first device description of the plurality is a fieldbus device description and a second device description of the plurality is a HART device description.

* * * * *

UNITED STATES PATENT AND TRADEMARK OFFICE
CERTIFICATE OF CORRECTION

| | | |
|---|---|---|
| PATENT NO. | : 6,889,166 B2 | Page 1 of 1 |
| DATED | : May 3, 2005 | |
| INVENTOR(S) | : Martin Zielinski et al. | |

It is certified that error appears in the above-identified patent and that said Letters Patent is hereby corrected as shown below:

<u>Title page,</u>
Item [56], References Cited, U.S. PATENT DOCUMENTS, insert:
-- 5,148,378        09/15/92        Shibayama et al.        364/571.07 --.

Signed and Sealed this

Sixth Day of December, 2005

JON W. DUDAS
*Director of the United States Patent and Trademark Office*